(12) United States Patent
Sylvester et al.

(10) Patent No.: US 12,697,888 B1
(45) Date of Patent: Aug. 4, 2026

(54) WIRELESS CHARGING SYSTEM FOR A ROAD

(71) Applicant: INTEGRATED ROADWAYS IP LLC, Miami Beach, FL (US)

(72) Inventors: Tim Sylvester, Kansas City, MO (US); Tiziano Pedersoli, Overland Park, KS (US)

(73) Assignee: INTEGRATED ROADWAYS IP LLC, Miami Beach, FL (US)

( * ) Notice: Subject to any disclaimer, the term of this patent is extended or adjusted under 35 U.S.C. 154(b) by 697 days.

(21) Appl. No.: 18/145,048

(22) Filed: Dec. 22, 2022

(51) Int. Cl.
| | |
|---|---|
| *B60L 53/12* | (2019.01) |
| *B60L 53/66* | (2019.01) |
| *E01F 11/00* | (2006.01) |
| *H02J 50/00* | (2016.01) |
| *H02J 50/70* | (2016.01) |

(52) U.S. Cl.
CPC .............. *B60L 53/12* (2019.02); *B60L 53/66* (2019.02); *E01F 11/00* (2013.01); *H02J 50/005* (2020.01); *H02J 50/70* (2016.02)

(58) Field of Classification Search
CPC .......... B60L 53/12; B60L 53/32; B60L 53/66; B60L 5/005; H02J 50/005; H02J 50/70
See application file for complete search history.

(56) References Cited

U.S. PATENT DOCUMENTS

| | | | | | |
|---|---|---|---|---|---|
| 5,573,090 | A | * | 11/1996 | Ross | B60L 5/005 |
| | | | | | 320/109 |
| 9,027,723 | B2 | | 5/2015 | Niizuma | |
| 9,139,962 | B2 | | 9/2015 | Smith | |
| 2011/0025267 | A1 | | 2/2011 | Kamen et al. | |
| 2015/0303714 | A1 | | 10/2015 | Keeling et al. | |
| 2019/0381903 | A1 | | 12/2019 | Shin et al. | |
| 2023/0122088 | A1 | * | 4/2023 | Mccool | H02J 50/40 |
| | | | | | 320/108 |

FOREIGN PATENT DOCUMENTS

CA 2609641 C 11/2006

* cited by examiner

*Primary Examiner* — David V Henze
(74) *Attorney, Agent, or Firm* — Fredrikson & Byron, P.A.

(57) ABSTRACT

A wireless charging system for a road. The wireless charging system comprises a strain sensor array embedded within the road. The strain sensor array is configured to generate data regarding strain on the road corresponding to passing vehicles. The wireless charging system additionally comprises a wireless power charger embedded within the road. The wireless power charger is configured to induce wireless charging in the vehicles. The wireless charging system further comprises at least one control processor in communication with the strain sensor array and the wireless power charger. The control processor is configured to control the wireless power charger based on the data received from the strain sensor array.

17 Claims, 8 Drawing Sheets

WIRELESS CHARGING SYSTEM FOR A ROAD

CROSS-REFERENCE TO RELATED APPLICATIONS

The present application is filed contemporaneously with identically-titled U.S. patent application Ser. No. 18/145, 055, filed Dec. 22, 2022, the entire disclosure of which is hereby incorporated by reference herein.

FIELD OF THE INVENTION

Embodiments of the present invention relate to wireless charging systems for roads. More particularly, embodiments, of the present invention relate to a wireless charging system configured to sense when a vehicle is traveling on the road and to provide wireless charging to the vehicle in response.

BACKGROUND

Recent advances in electric motors and electrical power storage have facilitated an increase in the manufacture and use of electric vehicles, some of which implement autonomous and/or self-driving technologies. Previously, electric vehicles were dependent on being recharged at periodic or regular intervals. For example, for a daily-commuter electric vehicle, the vehicle's battery would generally be recharged at the operator's home overnight. Alternatively, for a long-haul electric vehicle, the vehicle's battery would generally be recharged periodically, at stops during the trip, once the battery level of the vehicle had been sufficiently depleted. Unfortunately, such periodic charging of electric vehicles is inconvenient and burdensome for the operator. For instance, the single charge range of the daily-commuter electric vehicle can place restrictions on how far the operator can commute each day. Similar inconveniences are present with the long-haul electric vehicle. Further, the charging time needed to recharge an electric vehicle once stopped at a charging station can necessitate a significant increase in travel time for the operator of the long-haul electric vehicle. Furthermore, many geographic locations have limited charging stations, which can make it difficult for electric vehicle operators to find suitable locations to charge.

In view of the above, it would be beneficial to provide charging systems that can recharge vehicles (e.g., the batteries of electric vehicles) during travel, so as to increase the range of the electric vehicles without requiring the additional time and cost associated with stopping the electric vehicles to recharge (e.g., at home, at work, or otherwise at charging stations). In particular, there is a need for wireless charging systems for roads, which can wirelessly charge vehicles as the vehicles travel on the roads.

SUMMARY OF THE INVENTION

Embodiments of the present invention address one or more of the above-mentioned problems and provide a distinct advance in the art of charging vehicles, and particularly electric vehicles. Specifically, embodiments of the present invention may provide a wireless charging system for a road. The wireless charging system comprises a strain sensor array embedded within the road. The strain sensor array is configured to generate data regarding strain on the road corresponding to passing vehicles. The wireless charging system additionally comprises a wireless power charger embedded within the road. The wireless power charger is configured to induce wireless charging in the vehicles. The wireless charging system further comprises at least one control processor in communication with the strain sensor array and the wireless power charger. The control processor is configured to control the wireless power charger based on the data received from the strain sensor array.

Embodiments of the present invention may also provide a method of wirelessly charging a vehicle traveling on a road. The method comprises a step of sensing, via a strain sensor array embedded within the road, the vehicle traveling on the road. The sensing step includes generating, via the strain senor array, strain data regarding strain on the road corresponding to the vehicle traveling on the road. An additional step includes providing the strain data to at least one control processor in communication with the strain sensor array. A further step includes transmitting, via a wireless power charger embedded within the road, energy wirelessly to the vehicle. The transmitting step is controlled by the at least one control processor in communication with the wireless power charger, with the control processor being configured to control the wireless power charger based on the strain data generated by the strain sensor array.

Embodiments of the present invention may further provide yet another wireless charging system for a road. The wireless charging system comprises a strain sensor array embedded within the road. The strain sensor array is configured to generate data regarding strain on the road corresponding to passing vehicles. The system additionally comprises a wireless power charger embedded within the road. The wireless power charger is configured to induce wireless charging in the vehicles. The strain sensor array is positioned below the wireless power charger.

Embodiments of the present invention may further provide yet another method of wirelessly charging a vehicle traveling over a road. The method comprises a step of sensing, via a strain sensor array embedded within the road, the vehicle traveling on the road. An additional step includes generating, via the strain sensor array, strain data regarding strain on the road corresponding to the vehicle traveling on the road. A further step includes transmitting, via a wireless power charger embedded within the road, energy wirelessly to the vehicle. The strain sensor array is positioned below the wireless power charger within the road.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
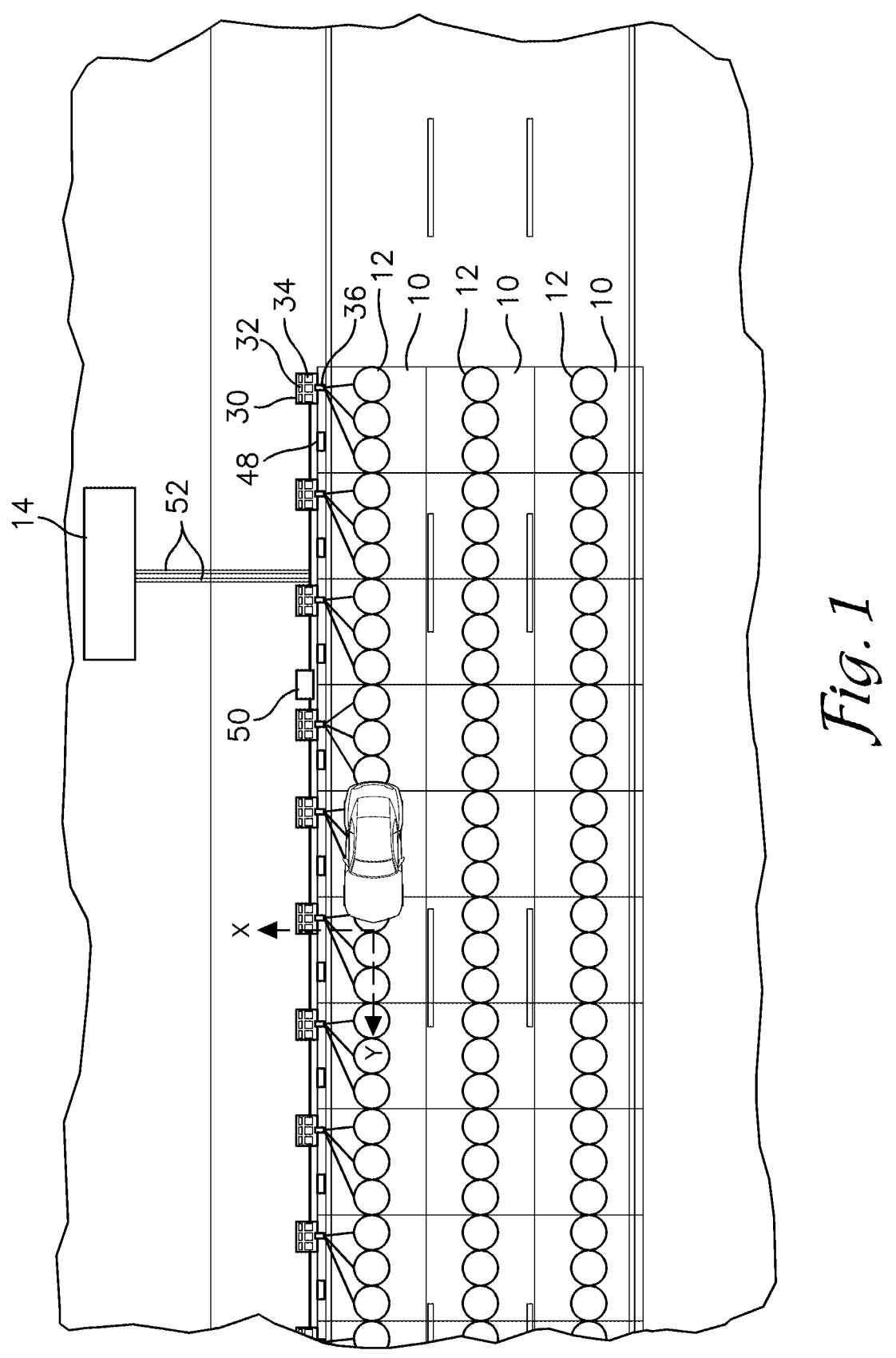
FIG. 1 is a top schematic view of a wireless charging system for a road according to embodiments of the present invention, particularly illustrating the system transmitting wireless power to a vehicle traveling on a surface of the road.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

Embodiments of the present invention include a wireless charging system for a road. Such a wireless charging system and road may be described elsewhere herein as a "pavement system." FIG. 1 illustrates an exemplary pavement system in accordance with embodiments of the present invention. In more detail, the pavement system includes a plurality of roadway sections 10, illustrated in FIGS. 1-4, aligned along a longitudinal or y-axis corresponding to a direction of travel of vehicles or other masses across top surfaces of the roadway sections 10. The illustrative pavement system includes three (3) lanes, each being respectively formed from a plurality of roadway sections 10 aligned along the y-axis. Each lane may include one or more roadway sections 10. It is foreseen that the pavement system may include more or fewer lanes without departing from the spirit of the present invention.

The roadway sections 10 may be pre-cast slabs comprising concrete paving material, described in the exemplary embodiments in more detail below. It should be noted, however, that in one or more embodiments the pavement system may comprise one or more lanes formed of cast-in-place concrete installations, continuous pour asphalt pavement material, or other pavement types. In cast-in-place installations, roadway sections may include one or more lengths of roadway separated by saw cut joints, typically made to reduce the chances of roadway damage/cracking from cyclical expansion and contraction.

Each roadway section 10 of the illustrated embodiment may include three (3) wireless power chargers 12. The wireless power chargers 12 may include or comprise wireless charge emitters and/or transceivers. Each wireless charge emitter and/or transceiver preferably includes one or more inductive coil(s) or layers of conductive material configured to conduct current of supplied power in a spatial pattern that generates and projects an electromagnetic (EMF) field extending up and above the top surface of the corresponding roadway section 10 for wireless battery charging of passing vehicles (e.g., according to Faraday's law of induced voltage). Each of the wireless power chargers 12 may be configured for unidirectional charging of batteries of vehicles passing along a top surface of the roadway sections 10 or for bidirectional charging in communication with electrical circuits positioned on or adjacent to the top surface of the slabs. One of ordinary skill will appreciate that an individual slab or roadway section 10 may include more or fewer wireless power chargers 12, at different and/or variable spacing and/or of different configuration/shape, without departing from the spirit of the present invention.

Figure 5:
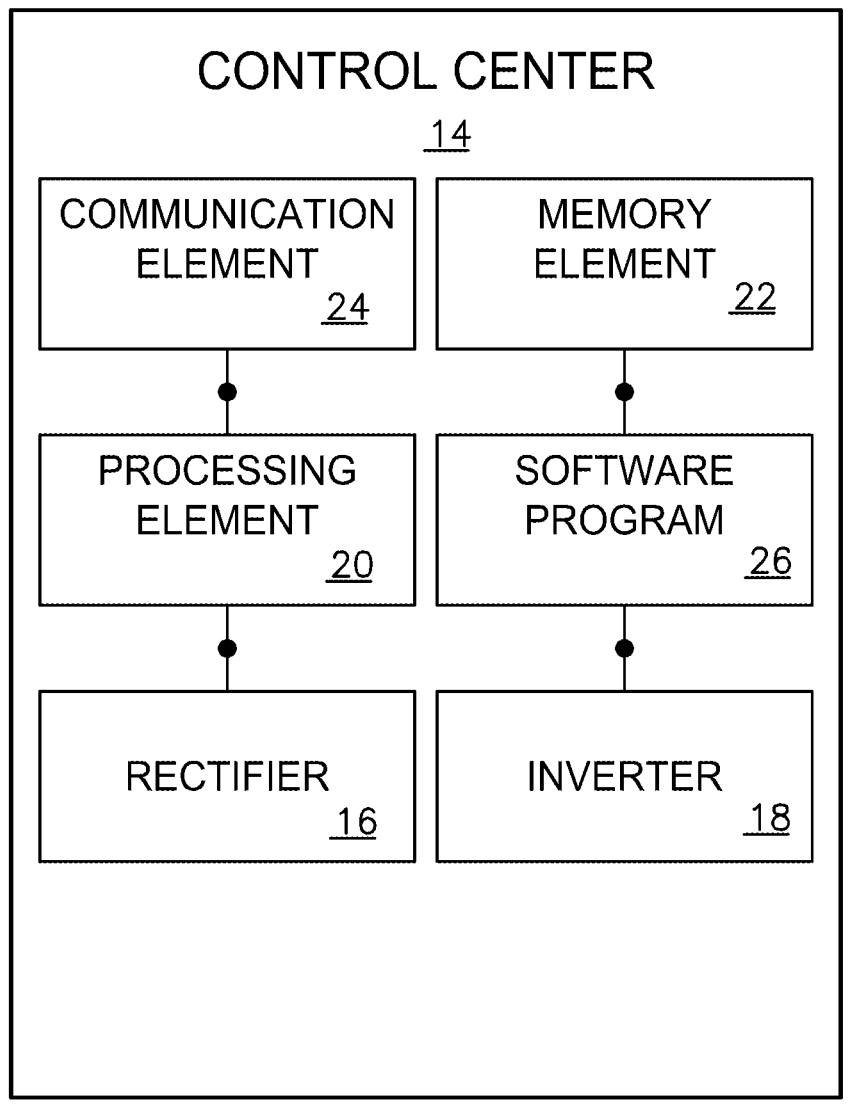
FIG. 5 is a schematic block diagram of a control center of the wireless charging system from FIG. 1.

Power to the wireless power chargers 12 is supplied, conditioned, tuned, transformed, converted and/or otherwise changed and/or controlled by one or more control centers 14, as illustrated in FIG. 1. Turning briefly to FIG. 5, each control center 14 may include a rectifier 16, an inverter 18, a processing element 20, a memory element 22, a communication element 24, and a software program 26, each of which is discussed in more detail below. It should also be noted that one or more components of a control center 14 may be housed remotely and/or embedded in or with components of a roadway section 10 without departing from the spirit of the present invention.

The control center 14 receives power from a power supply such as a public utility line and/or from upstream switchgear (not shown), and prepares same for supply to the wireless power chargers 12. For example, in one or more embodiments, the control center 14 receives alternating current (AC) power at 750 kW and 110A, and increases the frequency of the power using the rectifier 16 and inverter 18 for supply to the wireless power chargers 12.

The control center 14 may initially supply power to junction boxes 30, which may each include one or more switching devices 32 and tuning network devices 34. The switching device(s) 32 and corresponding tuning network device(s) 34 may serve as intermediate components for electrical communication between the wireless power chargers 12 and the control center 14. One of ordinary skill will appreciate that more, fewer and/or different intermediate components may be used to supply power to the wireless power chargers 12 without departing from the spirit of the present invention. The exemplary junction boxes 30 are adjacent the sides of the corresponding roadway sections 10 and may be set or embedded in a shoulder of the roadway, with top portions approximately flush with the top surface of the roadway to provide periodic access thereto for maintenance.

In more detail, each junction box 30 may be configured to provide power from the control center 14 to at least one of the roadway sections 10. As such, each junction box 30 may contain or include one or more switching device(s) 32 and corresponding tuning network device(s) 34, with each pair of switching device 32 and tuning network device 34 supplying power to one of the wireless power chargers 12 of a given roadway section 10. Thus, for example, in embodiments in which the roadway sections 10 each include three (3) wireless power chargers 12, each junction box 30 may include three (3) pairs of switching devices 32 and tuning network devices 34. The switching device 32 may, for example, be a metal-oxide-semiconductor field-effect transistor (MOSFET) switch or any other switch device for switching and/or amplifying the power signal to the corresponding wireless power charger 12. The tuning network device 34 may, for example, be a transformer configured to increase or decrease the voltage and/or other characteristics of the power for supply to the corresponding wireless power charger 12. The wires or conductors carrying the power to the wireless power chargers 12 from the junction boxes 30 may be routed through one or more conduits and/or edge connectors 36 illustrated in FIGS. 1 and 2. In some embodiments, adjacent roadway sections 10 in different lanes (i.e., adjacent along the x-axis) may be connected via edge connectors 36, as shown in FIG. 2, such that a given junction box 30 may facilitate power distribution and/or communication with such adjacent roadway sections 10.

Returning to the control center 14, in one or more embodiments, the processing element 20, the memory element 22, the communication element 24 and/or the software program 26 comprise a master controller. The master controller may be in electronic communication (e.g., via the communication element 24) with one or both of the switching devices 32 and/or tuning network devices 34 (of the junction boxes 30) corresponding to each of the wireless power chargers 12 of the pavement system. The electronic communication may permit such electronic devices in each of the junction boxes 30 to provide data regarding operation and/or faults of the wireless power chargers 12 and/or supporting power supply or control infrastructure and/or intermediate components. The electronic communication may also or alternatively permit the master controller to communicate commands to the junction box 30 electronic components and/or components of the wireless power chargers 12, for example where the master controller commands one or more switching device(s) 32 to power or shut down power to the corresponding wireless power charger(s) 12 or commands one or more tuning network device(s) 34 to increase or decrease the voltage of the power supplied to the corresponding wireless power chargers 12.

Figure 2:
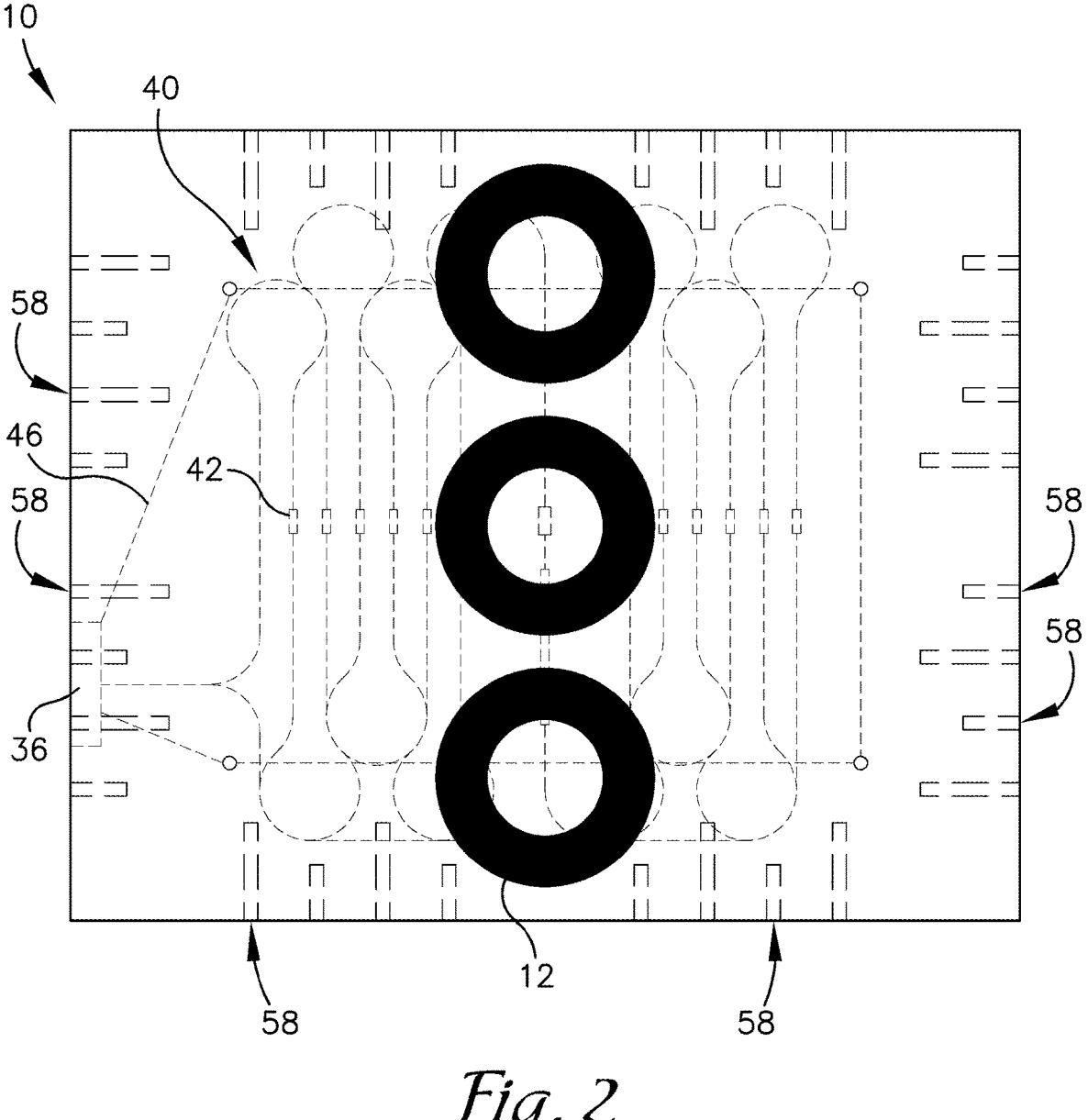
FIG. 2 is a top schematic view of a roadway section from the wireless charging system from FIG. 1, particularly illustrating a strain sensor array and a plurality of wireless power chargers embedded within the roadway section.

Turning to FIG. 2, in one or more embodiments, each roadway section 10 includes a strain sensor array 40. The strain sensor array 40 is distributed at least partly, and preferably mostly, across the length and width of a body of the roadway section 10. The strain sensor array 40 may include one or more optical fiber sensors 42. The strain sensor array 40 may embody optical fiber sensing technologies including but not limited to one or more of Rayleigh, Brillouin, Raman, or Fiber Bragg Grating (FBG) technologies, with corresponding sensors 42 or sampling area(s) distributed along the length of the fiber(s).

In one or more embodiments comprising FBGs, the FBGs are positioned in the optical fiber with selectable space therebetween. Each FBG, or any other method implemented as described above but not limited to those specifically named, provides a measurement of the strain of its surrounding environment, which is a local volume, element or region of the body of the roadway section 10. It should be noted that emitters and receivers of optical fiber sensors 42 may comprise a single device or multiple devices. Generally, each FBG reflects an optical signal, of a particular wavelength or small band of wavelengths, that it receives. The characteristics, such as intensity, amplitude, wavelength, and/or time delay, of the optical signal reflection may vary according to a strain, potentially among other factors, placed on the FBG. One of ordinary skill will appreciate that various mechanisms for detecting strain—including mechanisms for detecting strain using other optical fiber sensing technologies—may be employed in the strain sensor array 40 within the scope of the present invention.

The optical fibers of the array 40 shown in FIG. 2 are implemented in elongated loops with enlarged turns on each end, with the loops being arranged in an alternating pattern offset relative to adjacent loops along the y-axis. However, one of ordinary skill will appreciate that sensors may be implemented within a body of pavement material in other patterns—for example, in a serpentine pattern layout, a coil pattern layout, a grid pattern, an array of individual fiber optic lines, or other geometric pattern layouts—without departing from the spirit of the present invention. Moreover, a sensor array 40 may include more or fewer optical fibers and/or may comprise additional or alternative strain sensors (e.g., piezoelectric strain sensors) without departing from the spirit of the present invention. In some embodiments, the strain sensor array 40 may extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the length of the roadway section 10. Similarly, the strain sensor array 40 may extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the width of the roadway section 10. Stated differently, the roadway section 10 (which may be formed as a precast slab) has a perimeter defined by a plurality of sides and the strain sensor array 40 is distributed along at least fifty percent (50%) (or at least sixty percent (60%), or at least seventy percent (70%), or at least eighty percent (80%), or at least ninety percent (90%), or at least one-hundred percent (100%)) of a length of the precast slab as defined along the first dimension inside the perimeter and along at least fifty percent (50%) (or at least sixty percent (60%), or at least seventy percent (70%), or at least eighty percent (80%), or at least ninety percent (90%), or at least one-hundred percent (100%)) of a width of the precast slab as defined along the second dimension inside the perimeter.

The sensor array 40 may include and/or be in communication with supporting components—such as an embedded interrogator—within the scope of the present invention. For example, embodiments of the present invention are interoperable with the paving systems and sensor array(s) described in U.S. Patent Publication 2021/0222375 A1 to Sylvester, filed Apr. 9, 2021, and in U.S. patent application Ser. No. 18/048,886 to Sylvester, filed Oct. 24, 2022, each of which is hereby incorporated by reference herein in its entirety. In one or more embodiments, the control center 14 is in electronic communication (e.g., via the communication element 24) with an interrogator which, in turn, operates in conjunction with the fiber optic sensors 42 of the sensor array 40 to generate sensor data. As described in more detail below, the sensor data may include information indicative of a vehicle traveling and/or passing on the top surface of the roadway section 10.

The total number of sensors 42 in the sensor array 40, as well as the positions of the sensor within the roadway section 10, may be selected based at least in part on their respective intended utility and usage. For example, in connection with configuring a roadway section 10 to read transient signals from a vehicle passing over the roadway section 10, the number, size, and placement of the sensors 42 of the sensory array 40 may be chosen to ensure the sensor array 40 is capable of sufficiently detecting and identifying individual vehicle tires, as well as measuring the location, weight, and dimensions of those tires.

Figure 4:
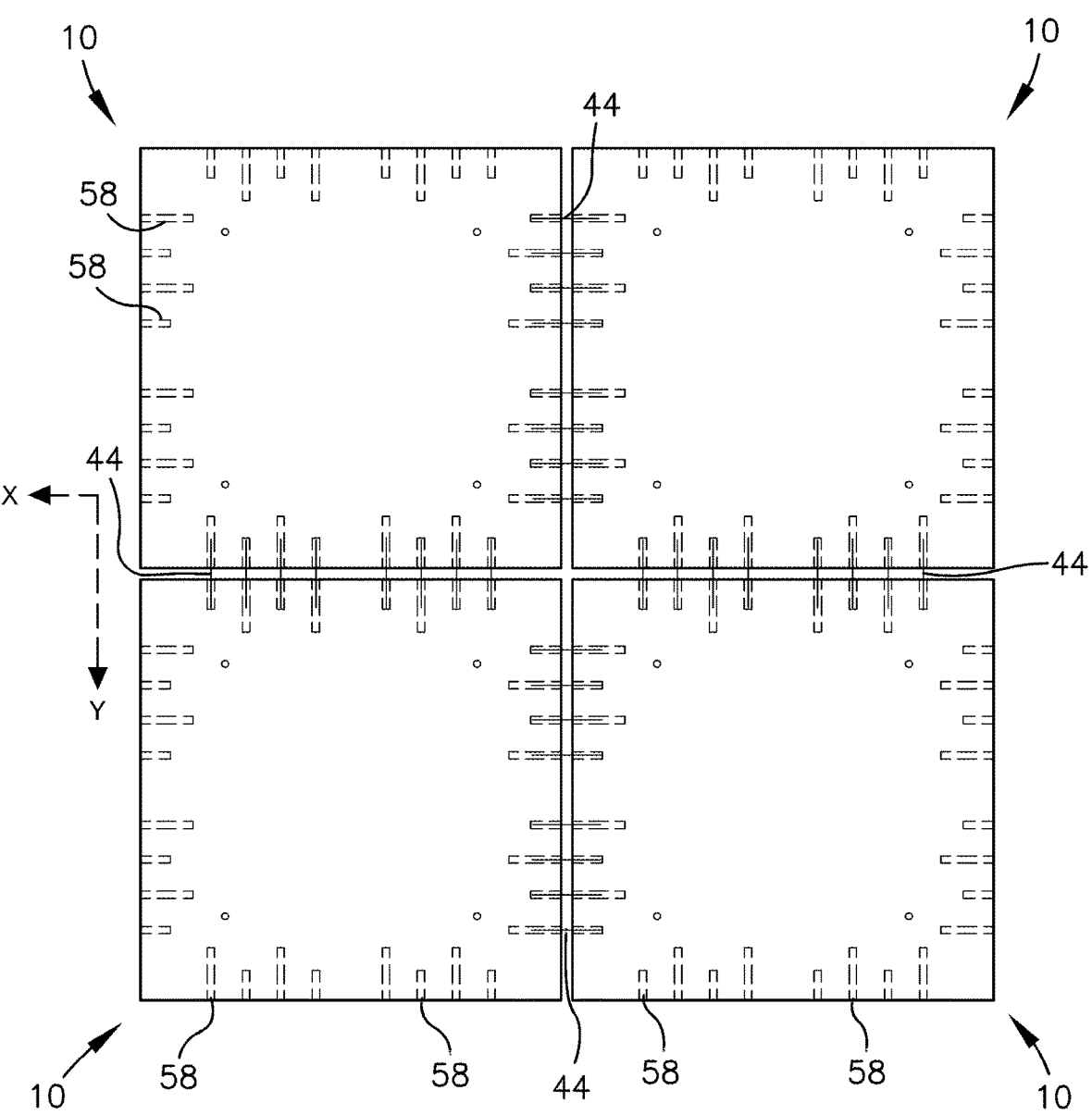
FIG. 4 is a top schematic view of four roadway sections interconnected via load-transferring connectors according to embodiments of the present invention.

Turning briefly to FIG. 4, the roadway sections 10 of the illustrated embodiment also include structural links comprising load-transferring connectors 44 (e.g., dowel rods), discussed in more detail below. However, it should be noted that the paving material of the roadway and delineations between sections 10 or sensing volumes, and associated structural components, may vary within the scope of the present invention. For example, cast-in-place concrete sections delineated by saw cut joints (e.g., without load-transferring connectors), or continuous pour installations (e.g., comprising asphalt without reinforcement layers or load-transferring connectors) are also within the scope of the present invention.

In one or more embodiments, a sensing volume of a section of pavement (e.g., a roadway section 10) may comprise an area of the roadway monitored by a sensor array 40 comprising fiber optic cable(s) and one or more interrogator(s), where each interrogator transmits and receives optical signals reflecting stress and strain in the section. In one or more embodiments, a sensing volume of a section of pavement comprises an area of the roadway delineated by physical boundaries comprising the sides of a precast slab or a combination of saw cut joints and sides of a cast-in-place concrete installation (either of which may be in the form of a roadway section 10).

An advantage of the precast roadway sections 10 of the illustrated embodiment is realized through added data dimensionality available through monitoring condition and/or strains across multiple sensor arrays 40 respectively corresponding to multiple roadway sections 10 interconnected with load-transferring connectors 44 extending therebetween.

However, it is also foreseen that a sensor array 40 may be omitted, alternatively configured or replaced by other sensing technologies without departing from the spirit of the present invention.

Returning to FIG. 1, the master controller of the control center 14 may additionally be in electronic communication (e.g., via wired connections, 46 of FIG. 2) with and may receive strain sensor data from the strain sensor arrays 40 embedded in the roadway sections 10. The wired connections 46 may be routed via edge connectors 36 through one or more junction boxes 50 illustrated in FIG. 1 for communication to the master controller (i.e., the control center 14). The master controller may communicate with and/or provide power to the components of the pavement system via wired connections 52. As such, the master controller may analyze the strain sensor data, alone and/or in communication with one or more remote server(s), to determine vehicle position on the pavement system and roadway sections 10 and, accordingly, provide commands for activation/deactivation of the wireless power chargers 12 and/or increasing or decreasing the voltage supplied to the wireless power chargers 12.

The communication element 24 generally allows communication with systems or devices external to the control center 14. The communication element 24 may include signal or data transmitting and receiving circuits, such as antennas, amplifiers, filters, mixers, oscillators, digital signal processors (DSPs), and the like. The communication element 24 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 24 may establish communication through connectors or couplers that receive metal conductor wires or cables which are compatible with networking technologies such as ethernet. The communication element 24 may also couple with optical fiber cables, e.g., via an interrogator. The communication element 24 may be in communication with or electronically coupled to memory element 22 and/or processing element 20.

Preferably the devices of the pavement system communicate via secure and/or encrypted communication means. For example, all or some of the roadway sections 10, the control center 14 and remote server(s) may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory element 22 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 22 may include, or may constitute, a "computer-readable medium." The memory element 22 may store the instructions, code, code segments, software, firmware, programs, applications, apps, services, daemons, or the like that are executed by the processing element 20, such as the software program 26. The memory element 22 may also store settings, data, documents, files, photographs, movies, images, databases, and the like, for example where such data is captured by additional infrastructure sensors and/or relates to utilization of the wireless power chargers 14 by passing vehicles.

The processing element 20 may include processors, microprocessors, microcontrollers, DSPs, field-programmable gate arrays (FPGAs), analog and/or digital application-specific integrated circuits (ASICs), or the like, or combinations thereof. The processing element 20 may include digital processing unit(s). The processing element 20 may generally execute, process, or run instructions, code, code segments, software, firmware, programs, applications, apps, processes, services, daemons, or the like. The processing element 20 may also include hardware components, such as finite-state machines, sequential and combinational logic, and other electronic circuits that may perform the functions necessary for the operation of embodiments of the present invention. For example, the processing element 20 may execute the software program 26, where the software program 26 includes computer-readable instructions instructing the processing element 20 to complete all or some of the steps described herein. The processing element 20 may be in communication with the other electronic components through serial or parallel links that include address busses, data busses, control lines, and the like.

In view of the above, embodiments of the present invention are configured to sense when a vehicle is travelling over the road and wirelessly charge the vehicle in response to such sensing. In particular, embodiments of the present invention include a strain sensor array 40 embedded within the road, with the strain sensor array 40 being configured to generate data (e.g., strain data) regarding strains and/or stresses on the road corresponding to the vehicle passing and/or driving on the top surface of the road. Thus, the strain sensor array 40 is configured to sense when a vehicle is traveling on the road.

Embodiments additionally include a wireless power charger 12 embedded within the road, with the wireless power charger 12 being configured to induce wireless charging in the vehicle. Embodiments further include at least one control processor, such as processing element 20 of the control center 14, in communication with the strain sensor array 40 and the wireless power charger 12. As such, the control processor is configured to control the wireless power charger 12 (e.g., activate or deactivate the wireless power charger 12) based on the data received from the strain sensor array 40. Specifically, for example, when the strain sensor array 40 senses that the vehicle is (or will soon be) traveling on the road, and particularly on the roadway section 10 within which the strain sensor array 40 is embedded, the control processor can instruct the wireless power charger 12 (within the particular roadway section 10 or within a downstream roadway section 10) to generate an EMF field to induce wireless charging in the vehicle. Specifically, the wireless power charger 12 can generate the EMF field upward above the top surface of the road to be received by the inductive components associated with the vehicle to cause wireless charging of the vehicle's battery. Furthermore, in some embodiments, the strain sensor array 40 is positioned below the wireless power charger 12, as illustrated in FIG. 2, such that the components of the strain sensor array 40 will not interfere with the EMF field generated by the wireless power charger 12.

Figure 3:
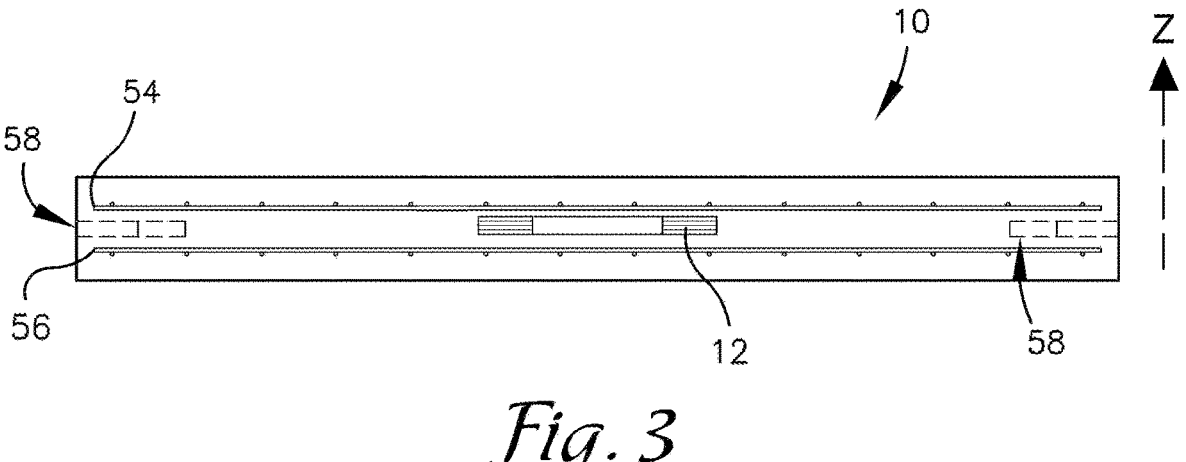
FIG. 3 is a cross section of a roadway section from the wireless charging system from FIG. 1, taken along an x-axis of the system and bisecting a wireless power charger, particularly illustrating the wireless power charger positioned between an upper reinforcement layer and a lower reinforcement layer, all embedded within the roadway section.
Figure 6:
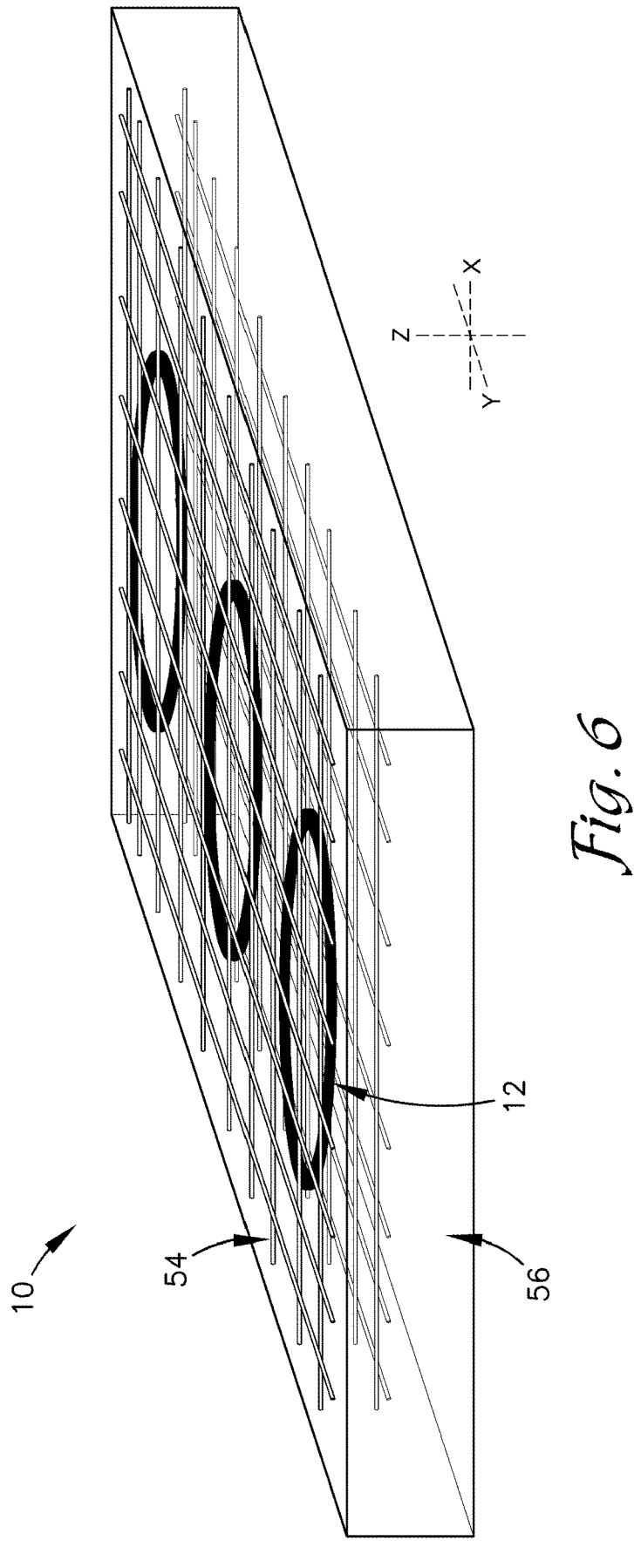
FIG. 6 is a perspective schematic view of a roadway section from the wireless charging system from FIG. 1, particularly illustrating a plurality of wireless power chargers positioned between an upper reinforcement layer and a lower reinforcement layer, all embedded within the roadway section.

With reference to FIGS. 3 and 6, the roadway sections 10 may also each include one or more internal reinforcement layers 54, 56 embedded therein. Although the reinforcement layers 54, 56 may have various shapes and sizes, in some embodiments, the reinforcement layers 54, 56 may comprise a framework of spaced rods, bars, or other elongated elements that are parallel to and/or that cross each other, such as in the form of a grid or a grating as illustrated in FIG. 6. In some embodiments, the internal reinforcement layers 54, 56 may each extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the length of the roadway section 10. Similarly, the internal reinforcement layers 54, 56 may each extend, within its respective roadway section 10, no less than fifty percent (50%), no less than sixty percent (60%), no less than seventy percent (70%), no less than eighty percent (80%), no less than ninety percent (90%), and/or no less than one-hundred percent (100%) of the width of the roadway section 10. Stated differently, the roadway section 10 (which may be formed as a precast slab) has a perimeter defined by a plurality of sides and the reinforcement layers 54, 56 are distributed along at least fifty percent (50%) (or at least sixty percent (60%), or at least seventy percent (70%), or at least eighty percent (80%), or at least ninety percent (90%), or at least one-hundred percent (100%)) of a length of the precast slab as defined along the first dimension inside the perimeter and along at least fifty percent (50%) (or at least sixty percent (60%), or at least seventy percent (70%), or at least eighty percent (80%), or at least ninety percent (90%), or at least one-hundred percent (100%)) of a width of the precast slab as defined along the second dimension inside the perimeter.

As illustrated in FIGS. 3 and 6, the reinforcement layer 54 is generally positioned, within a given roadway section 10, above the wireless power chargers 12 of the roadway section 10, such that the reinforcement layer 54 may be referred to as an upper reinforcement layer 54. Correspondingly, the reinforcement layer 56 is generally positioned, within the given roadway section 10, below the wireless power chargers 12 of the roadway section 10, such that the reinforcement layer 56 may be referred to as a lower reinforcement layer 56.

In some embodiments, the reinforcement layers 54, 56 may comprise at least one layer of metal lattice (e.g., steel or iron rebar) or other internal reinforcement structures such as fiberglass reinforcement mat; geotechnical mat; composite rebar, rods, mats, or structures; polymer rebars, rods, mats, or structures; ferrite rebars, rods, mats, or structures; carbon fiber mat, or loose reinforcement material such as fiberglass fibers, carbon fibers, plastic fibers, or metallic shavings. However, in one or more embodiments, the upper internal reinforcement layer 54 may be comprised of only those non-magnetic shielding materials listed above or otherwise which are non-metallic, non-ferrite material(s) that will not substantially interfere with, shield against, insulate and/or isolate the electromagnetic field (EMF) emitted upward from the wireless power chargers 12, which are positioned below the upper internal reinforcement layers 54. For instance, in some specific embodiments, the upper reinforcement layer 54 may be comprised of polymer rebars, bars, mats, or other structures. In other embodiments, the upper reinforcement layer 54 may comprise non-magnetic shielding metals, such as aluminum, copper, brass, gold, silver, titanium, or tungsten. In contrast, the lower reinforcement layer 56 may be comprised of any of the above-listed materials, including any of the magnetic shielding materials or non-magnetic shielding materials. For instance, the lower internal reinforcement layer 56 may be comprised of ferrite, as well as ferrous materials (e.g., iron). Furthermore, it is contemplated that either (or both) of the upper and lower reinforcement layers 54, 56 may be formed from materials that are electrically conductive, thermally conductive, or both.

As used herein, the term "magnetic shielding material" means any material exhibiting a relative magnetic permeability of at least four (4). In certain embodiments, the magnetic shielding material used will exhibit a relative magnetic permeability of at least at least eight (8), at least ten (10), at least one hundred (100), at least five hundred (500), or at least one thousand (1000). In certain preferred embodiments, such as when the magnetic shielding material comprises ferrite, the magnetic shielding material will have a relative permeability between fifteen hundred (1,500) and three thousand (3,000). Furthermore, in some embodiments, the magnetic shielding materials used herein may have a relative magnetic permeability that is at least four (4), at least eight (8), at least ten (10), at least one hundred (100), at least five hundred (500), or at least one thousand (1000) times greater than that of the material from which the roadway sections 10 are formed (e.g., concrete). Examples of magnetic shielding materials include iron, steel, and ferrite. Correspondingly, the term "non-magnetic shielding material" means any material exhibiting a relative magnetic permeability of less than four (4). Examples of non-magnetic shielding material include aluminum, copper, brass, polymers, and fiberglass.

In addition, the term "electrically conductive material" means a material within which electric current freely flows, i.e., a material with a resistivity of less than about $1.0 \times 10^{-3}$ ohm-meter. Examples of electrically conductive materials include steel, iron, aluminum, copper, graphite and conductive carbon. Correspondingly the term "non-electrically conductive material" means a material within which electric current does not freely flow, i.e., a material with a resistivity greater than about $1.0 \times 10^{-3}$ ohm-meter. Examples of non-electrically conductive materials include polymer and ferrite. Furthermore, the term "thermally conductive material" means a material within which heat freely flows, i.e., a material with a thermal conductivity greater than about five (5) watts per meter-kelvin. Examples of thermally conductive materials include steel, iron, aluminum, and ferrite. Correspondingly the term "non-thermally conductive material" means a material within which heat does not freely flow, i.e., a material with a thermal conductivity less than five (5) watts per meter-kelvin. Examples of non-thermally conductive materials include polymers.

More broadly, it is foreseen that embodiments of the present inventive concept, including the upper and lower reinforcement layers 54, 56 are interoperable with the paving systems and apparatuses described in U.S. Patent Publication No. 2016/0222594 A1 to Sylvester (filed Mar. 30, 2016), and in U.S. Patent Publication No. 2017/0191227 A1 to Sylvester (filed May 16, 2016), each of which is hereby incorporated by reference herein in its entirety.

While it is foreseen, as noted above, that embodiments of the present invention may be constructed in the field—for example as part of cast-in-place concrete or continuous pour asphalt installations—or be pre-fabricated into an assembly that can be installed onsite, it is preferred that the strain sensor array 40 be encased and permanently fixed within the body of the roadway section 10 during an offsite pre-fabrication process. The optical fiber sensors 42 of the exemplary array 40 may be laminated and/or fixed to one or more sides of a reinforcement layer 54, 56 of the roadway section 10 during fabrication, essentially extending in a substantially horizontal (XY) plane at a given height within the body of the roadway section 10.

Figure 7:
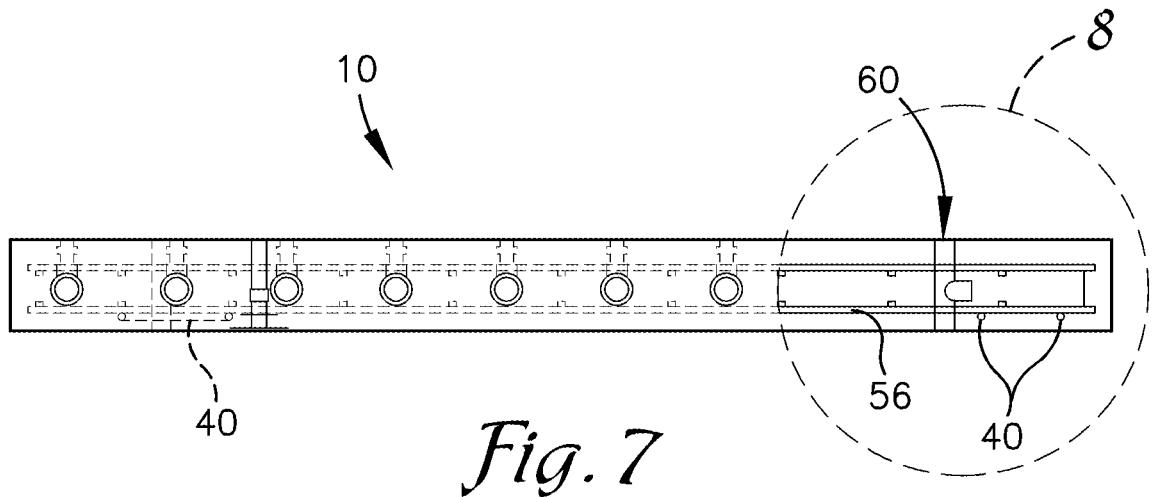
FIG. 7 is a front view of a roadway section from the wireless charging system from FIG. 1, partially sectioned along a line within a limited field of view corresponding to FIG. 8 and illustrating a strain sensor array attached to a lower reinforcement layer.
Figure 8:
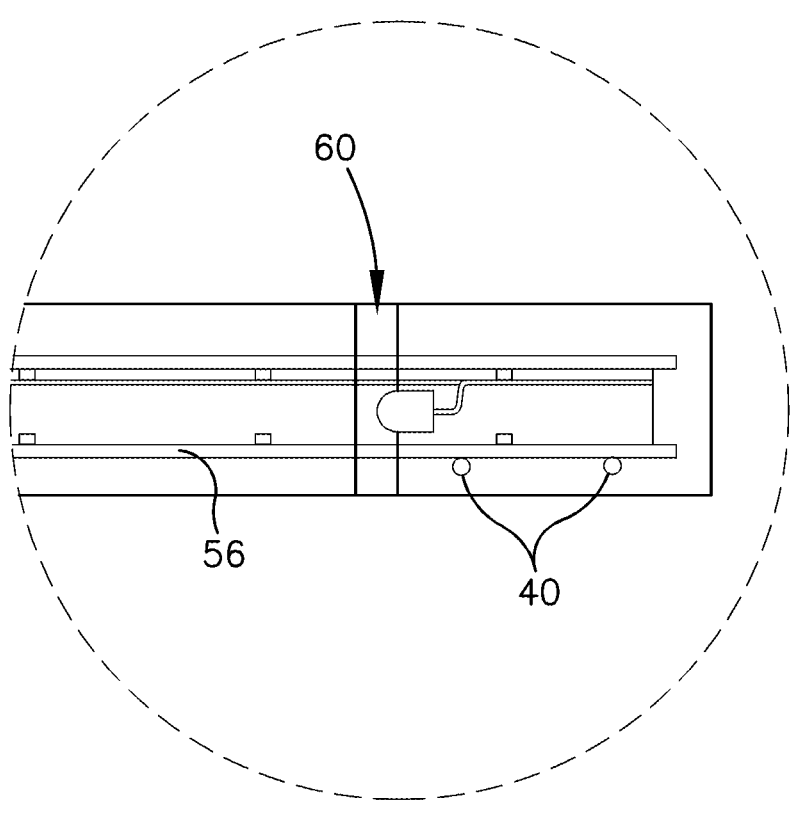
FIG. 8 is the detailed cross-sectional view of the limited field of view from FIG. 7.

More preferably, as illustrated in FIGS. 7 and 8, the sensors 42 (not shown in FIGS. 7 and 8) of the array 40 may be laminated and/or fixed to a bottom side of the lower or bottommost reinforcement layer 56 of the roadway section 10. Placement near the bottom of the body of the roadway section 10 may provide greater resolution from and/or amplification of data collected by the strain sensor array 40. Moreover, fixing the strain sensor array 40 to a reinforcement layer 54 and/or 56 may generate a more holistic data set representing changes in form across the entire body of the roadway section 10 because a preferred reinforcement layer 54, 56 will extend across substantially the entire length and width of the body of the roadway section 10 and may be less susceptible to localized distortions resulting from pockets or imperfections in the body.

It is foreseen that all or portions of a strain sensor array 40 may be encased at different and/or varying heights within a slab without departing from the spirit of the present inventive concept. For instance, disposing at least one sensor 42 at a different height within the roadway section 10—such as vertically above or below a second sensor 42—may provide additional resolution for detecting defects in the roadway section 10. However, long dimensions of the exemplary optical fiber sensors 42 are preferably in substantial alignment with a direction of travel, for example along the y-axis, which may improve detection of vehicular load progression across a top surface of the roadway section 10. Nevertheless, embodiments may provide for sensors 42 to also be distributed along a second dimension of the road perpendicular to the first dimension (e.g., along the x-axis). Dimensions of optical fiber sensors 42 that are transverse or perpendicular to the direction of travel may improve detection of the lateral position of such a vehicular load on the roadway section 10.

It is foreseen that a preferable arrangement of optical fiber sensors 42, each sensor 42 having a region of the roadway section 10 surface that it can optimally sense, and each sensor 42 having an orientation that improves detection of the longitudinal or lateral position of the vehicle load and position, will result in a sensor layout presenting a grid of sensors 42 oriented in the traverse and longitudinal dimensions such that their sensing areas overlap each other along the x and y axes to ensure that a maximum area of the surface of the roadway section 10 can be sensed simultaneously by one or more sensors 42 (e.g., oriented to the direction of travel and/or lateral position of the vehicle load on the roadway section 10).

As noted above, in one or more embodiments, load-transferring connectors 44 (see FIG. 4) may be set in cavities 58 formed in the roadway sections 10 to join the roadway sections 10 to one another (or other adjacent structures) along sides extending perpendicular to the direction of travel (i.e., in the "x" direction). In one or more embodiments, load-transferring connectors 44 also join the roadway sections 10 to one another (or other adjacent structures) along sides extending parallel to the direction of travel (i.e., in the "y" direction). The load-transferring connectors 44 may comprise, for example, dowel rods. However, in one or more embodiments, roadway sections 10 adjacent one another in the "x" direction may be joined using tie bars (not shown) or other load-transferring connectors. Interfaces between roadway sections 10 may also or alternatively incorporate a rubber skirt, backer board, spacing rod, tar mixture, grouting or similar buffering substance within the scope of the present invention. It is also foreseen that load-transferring connectors may be omitted along one or more sides of slabs or roadway sections without departing from the spirit of the present invention.

Figure 9:
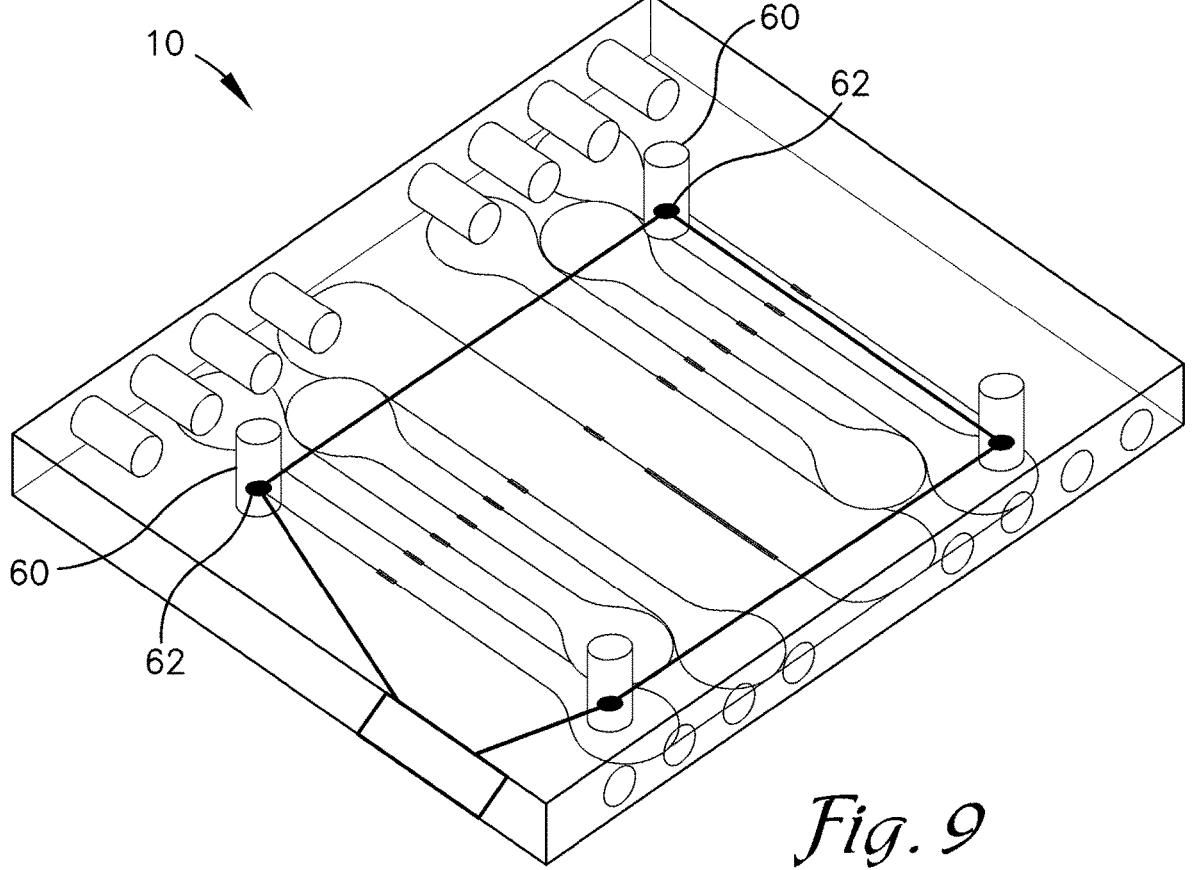
FIG. 9 is an elevated schematic view of a roadway section of the wireless charging system from FIG. 1, particularly illustrating communication elements positioned within access ports formed through a thickness of the roadway section.

Finally, as illustrated in FIG. 9, one or more of the roadway sections 10 may include a plurality of access ports 60 embedded within the roadway section 10, and in some embodiments positioned below the upper surface of the roadway section 10. The access ports may comprise cavities extending generally vertically at least partly through a thickness of the roadway section 10. In some embodiments, the access ports 60 may house embedded lifting receivers (not shown) and may be spaced about the roadway section 10 for balanced lifting of the roadway section 10 (e.g., one access port 60 in each of four quadrants of the roadway section 10). Access ports 60 may also permit fluid communication between upper and bottom surfaces and may be configured to house and/or provide access to other sensing equipment without departing from the spirit of the present invention. For example, in some embodiments the access ports 60 may house one or more communication elements 62, which are configured to communicate with vehicles traveling on the roadway section 10.

One or more embodiments of the present invention may be compatible with embodiments described in U.S. patent application Ser. No. 17/471,470 to Sylvester, entitled SYSTEMS AND COMPUTER-IMPLEMENTED METHODS FOR ANALYZING TRANSFER OF FORCE THROUGH PAVEMENT SLABS and filed Sep. 10, 2021, which is hereby incorporated by reference in its entirety. For example, one or more embodiments of the communication elements 62 may comprise and/or be positioned and/or seated/configured similarly to components illustrated in FIGS. 14A-E such as expansion module 240 within vertical cavity 236, and/or may be in electrical communication with and/or in contact with corresponding components illustrated therein and described in connection therewith (e.g., a plug/filler material and/or connector terminal 234).

One or more embodiments of the present invention may also or alternatively be compatible with embodiments described in U.S. Pat. No. 9,856,610 to Sylvester, entitled APPARATUS AND METHOD FOR SERVICING PAVEMENT and issued Jan. 2, 2018, which is hereby incorporated by reference in its entirety. For example, one or more embodiments of the communication elements 62 may comprise and/or be positioned and/or seated/configured similarly to components illustrated in FIG. 2b such as sensor 16 within port 12, and/or may be seated adjacent receiver 14 and/or relative to grouting port 20, in each case as described in the aforementioned patent.

Generally, the communication elements 62 will be configured to communicate with external systems or devices. As such, the communication elements 62 may include signal and/or data transmitting and receiving circuits, such as antennas, amplifiers, filters, mixers, oscillators, digital signal processors (DSPs), and the like. The communication elements 62 may establish communication wirelessly by utilizing radio frequency (RF) signals and/or data that comply with communication standards such as cellular 2G, 3G, 4G, LTE, or 5G, Institute of Electrical and Electronics Engineers (IEEE) 802.11 standard such as WiFi, IEEE 802.16 standard such as WiMAX, Bluetooth™, or combinations thereof. In addition, the communication elements 62 may utilize communication standards such as ANT, ANT+, Bluetooth™ low energy (BLE), the industrial, scientific, and medical (ISM) band at 2.4 gigahertz (GHz), commercially available or customized Radio Frequency Identification (RFID), or the like. Alternatively, or in addition, the communication elements 62 establish communication through connectors or couplers that receive metal conductor wires or metal conductor cables which are compatible with networking technologies such as ethernet. In certain embodiments, the communication elements 62 may also couple with optical fiber cables.

Regardless, the communication elements 62 may establish direct and/or indirect communication(s) with vehicles for transmitting raw and/or processed data collected via the strain sensor array 40. Such data may be used in connection with autonomous and/or self-driving technologies (e.g., Level 4 autonomous driving). In an embodiment, one or more of the communication elements 62 may continuously or periodically transmit such data—i.e., regarding objects and/or vehicles present on the roadway section 10 (e.g., position, velocity, weight, etc.)—to one or more autonomous vehicles to support automated navigation. In a more particular embodiment, data obtained via the strain sensor arrays 40 of a system of roadway section 10 may comprise and/or be integrated into vehicular location, positioning, navigation, telemetry, or obstacle avoidance systems to provide and/or improve accuracy of positional data in support of autonomous driving operations.

In addition, the communication elements 62 may receive data and/or information from vehicles implementing autonomous and/or self-driving technologies that are in the vicinity of, or traveling upon, the corresponding roadway section 10. The data and/or information may include velocity and/or heading information, vehicle identification information, and the like. The data and/or information may be utilized by the roadway section 10 for verification purposes, fault detection or correction purposes, and the like. Additionally, or alternatively, the data and/or information may be transferred to other roadway sections 10 in the vicinity or in the direction of travel of the vehicle.

The below example provides an illustration of embodiments of the inventive wireless charging system incorporating the communication elements 62 for use in selective wirelessly charging of vehicles traveling on a road. In some embodiments, not all vehicles traveling on the road will be eligible to receive wireless charging from the wireless charging system. For instance, the eligibility of a vehicle to receive wireless charging may be based on or determined from a valid key (e.g., an identifier, such as word, name, number, code, or other identifier) stored in a memory element associated with the vehicle. As the vehicle travels on the road, the strain sensor array 40 embedded within the road will sense that the vehicle is traveling on the road (e.g., the strain sensor array 40 will generate strain data regarding strains and/or stresses on the road corresponding to the vehicle passing and/or driving on the top surface of the road). The communication elements 62 within the road will also attempt to communicate with communication element (s) of the vehicle to determine if the vehicle is eligible/authorized to receive wireless charging.

If the vehicle provides appropriate eligibility information (e.g., a valid key), the processing element 20 of the control center 14 will cause the wireless power charger 12 within the road (within the particular roadway section 10 or within a downstream roadway section 10) to generate an EMF field to induce wireless charging in the vehicle, responsive to the determination of the vehicle's position on the roadway section 10 via the strain sensory array 40. In contrast, if the vehicle does not provide appropriate eligibility information, and/or if the vehicle is determined to be out of position, the control center 14 will not cause wireless charging to be provided to the passing vehicle. One of ordinary skill will appreciate that the eligibility determination may be omitted, and charging may be activated or provided based on vehicle position without an eligibility determination, within the scope of the present invention.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A wireless charging system for a road, said wireless charging system comprising:
   a strain sensor array embedded within the road, wherein the strain sensor array is configured to generate data regarding strain on the road corresponding to passing vehicles;
   a wireless power charger embedded within the road, wherein the wireless power charger is configured to induce wireless charging in the vehicles;
   a reinforcement layer embedded within the road with the wireless power charger positioned below the reinforcement layer, the reinforcement layer comprising non-magnetic shielding material;
   a second reinforcement layer embedded within the road with the wireless power charger positioned above the second reinforcement layer, the second reinforcement layer comprising magnetic shielding material; and
   at least one control processor in communication with the strain sensor array and the wireless power charger, wherein the control processor is configured to control the wireless power charger based on the data received from the strain sensor array.

2. The wireless charging system of claim 1, wherein the strain sensor array comprises at least one optical fiber sensor.

3. The wireless charging system of claim 1, wherein the strain sensor array includes a plurality of strain sensors distributed along a first dimension of the road and along a second dimension of the road perpendicular to the first dimension.

4. The wireless charging system of claim 3, wherein the road includes a precast slab in which the strain sensor array and the wireless power charger are embedded, wherein the road has a perimeter defined by a plurality of sides and the strain sensor array is distributed along at least fifty percent (50%) of a length of the precast slab as defined along the first dimension inside the perimeter and along at least fifty percent (50%) of a width of the precast slab as defined along the second dimension inside the perimeter.

5. The wireless charging system of claim 4, further comprising a plurality of load-transferring connectors embedded along a side of the plurality of sides and attached to an adjacent structure, the plurality of load-transferring connectors being configured to transfer load on the precast slab corresponding to the passing vehicles between the precast slab and the adjacent structure.

6. The wireless charging system of claim 1, wherein the wireless power charger is positioned above the strain sensor array within the road.

7. The wireless charging system of claim 1, wherein the wireless power charger is positioned above the reinforcement layer.

8. The wireless charging system of claim 7, wherein the reinforcement layer comprises a magnetic shielding material.

9. The wireless charging system of claim 8, wherein the magnetic shielding material comprises a ferrous material.

10. The wireless charging system of claim 7, wherein the reinforcement layer comprises a non-magnetic shielding material.

11. The wireless charging system of claim 1, wherein the non-magnetic shielding material comprises a polymer.

12. The wireless charging system of claim 1, wherein the second reinforcement layer comprises electrically conductive material.

13. The wireless charging system of claim 12, wherein the strain sensor array is attached to the second reinforcement layer.

14. The wireless charging system of claim 1, further comprising a communication element embedded within the road, wherein the communication element is configured to communicate with the vehicle.

15. A method of wirelessly charging a vehicle traveling on a road, said method comprising the steps of:
   (a) sensing, via a strain sensor array embedded within the road, the vehicle traveling on the road, wherein said sensing of step (a) includes generating, via the strain sensor array, strain data regarding strain on the road corresponding to the vehicle traveling on the road;
   (b) providing the strain data to at least one control processor in communication with the strain sensor array; and
   (c) transmitting, via a wireless power charger embedded within the road, energy wirelessly to the vehicle, wherein said transmitting of step (c) is controlled by the at least one control processor in communication with wireless power charger, the control processor being configured to control the wireless power charger based on the strain data generated by the strain sensor array, wherein the wireless power charger is embedded within the road: (i) below a reinforcement layer that comprises non-magnetic shielding material in the road, and (ii) above a second reinforcement layer that comprises magnetic shielding material in the road.

16. The wireless charging system of claim 1, wherein the strain sensor array comprises at least one optical fiber sensor fixed to the second reinforcement layer.

17. A wireless charging system for a road, said wireless charging system comprising:

a strain sensor array embedded within the road, wherein the strain sensor array is configured to generate data regarding strain on the road corresponding to passing vehicles, wherein the strain sensor array includes a plurality of strain sensors distributed along a first dimension of the road and along a second dimension of the road perpendicular to the first dimension;

a wireless power charger embedded within the road, wherein the wireless power charger is configured to induce wireless charging in the vehicles, wherein the road includes a precast slab in which the strain sensor array and the wireless power charger are embedded, and wherein the road has a perimeter defined by a plurality of sides;

at least one control processor in communication with the strain sensor array and the wireless power charger, wherein the control processor is configured to control the wireless power charger based on the data received from the strain sensor array; and a plurality of load-transferring connectors embedded along at least a side of the plurality of sides and attached to an adjacent structure, the plurality of load-transferring connectors being configured to transfer load on the precast slab corresponding to the passing vehicles between the precast slab and the adjacent structure.

\* \* \* \* \*